United States Patent
Le et al.

(10) Patent No.: US 11,164,079 B2
(45) Date of Patent: Nov. 2, 2021

(54) MULTI-GPU DEEP LEARNING USING CPUS

(71) Applicant: INTERNATIONAL BUSINESS MACHINES CORPORATION, Armonk, NY (US)

(72) Inventors: Tung D. Le, Ichikawa (JP); Haruki Imai, Yokohama (JP); Taro Sekiyama, Urayasu (JP); Yasushi Negishi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 992 days.

(21) Appl. No.: 15/843,244

(22) Filed: Dec. 15, 2017

(65) Prior Publication Data
US 2019/0188560 A1    Jun. 20, 2019

(51) Int. Cl.
*G06N 3/08* (2006.01)
*G06T 1/20* (2006.01)
*G06N 3/04* (2006.01)

(52) U.S. Cl.
CPC ............ *G06N 3/08* (2013.01); *G06N 3/04* (2013.01); *G06T 1/20* (2013.01)

(58) Field of Classification Search
CPC ............ G06N 3/08; G06N 3/04; G06N 3/084; G06N 3/0454; G06N 3/063; G06T 1/20
See application file for complete search history.

(56) References Cited

U.S. PATENT DOCUMENTS 8,468,109 B2    6/2013  Moussa et al.

FOREIGN PATENT DOCUMENTS

CN    106056529    4/2015
CN    104978601    8/2017

OTHER PUBLICATIONS

Cui et al, GeePS: Scalable deep learning on distributed GPUs with a GPU-specialized parameter server, 2016, ACM (Year: 2016).*
Cui et al, GeePS: Scalable deep learning on distributed GPUs with a GPU-specialized parameter server, 2016, Parallel Data Laboratory Carnegie Mellon University (Year: 2016).*
Edgar Solomonik, Erin Carson, Nicholas Knight, and James Demmel. 2016. Trade-offs between synchronization, communication, and computation in parallel linear algebra computations. ACM Trans. Parallel Comput. 3, 1, Article 3 (Jun. 2016), 47 pages.. (Year: 2016).*

(Continued)

*Primary Examiner* — Ann J Lo
*Assistant Examiner* — Shmuel Y Weinfeld
(74) *Attorney, Agent, or Firm* — Tutunjian & Bitetto, P.C.; Randall Bluestone (57) ABSTRACT

A computer-implemented method, computer program product, and computer processing system are provided for accelerating neural network data parallel training in multiple graphics processing units (GPUs) using at least one central processing unit (CPU). The method includes forming a set of chunks. Each of the chunks includes a respective group of neural network layers other than a last layer. The method further includes performing one or more chunk-wise synchronization operations during a backward phase of the neural network data parallel training, by each of the multiple GPUs and the at least one CPU.

18 Claims, 8 Drawing Sheets

(56) References Cited

OTHER PUBLICATIONS

Le, et al., "Involving CPUs into Multi-GPU Deep Learning", ICPE, Apr. 2018, 12 pages.
Krizhevsky, "One weird trick for parallelizing convolutional neural networks", arXiv:1404.5997v2, Apr. 2014, pp. 1-7.
"Deep Learning Software Packages", available at: https://public.dhe.ibm.com/software/server/POWER/Linux/mldl, last downloaded Nov. 11, 2017, pp. 1-8.
"BVLC/caffe", available at: https://github.com/BVLC/caffe/blob/536851c00e44d545649648, last downloaded Nov. 11, 2017, pp. 1-6.

\* cited by examiner

MULTI-GPU DEEP LEARNING USING CPUS

BACKGROUND

Technical Field

The present invention relates generally to machine learning and, in particular, to multi-Graphics Processing Unit (multi-GPU) deep learning using Central Processing Units (CPUs).

Description of the Related Art

The most important part of deep learning is training a neural network, which often processes a large amount of data and takes days to complete. Data parallelism is widely used for training a deep neural network on multiple GPUs in a single machine thanks to its simplicity. Nevertheless, its scalability is bound by data transfers that are mainly for exchanging and accumulating gradients among the GPUs.

Hence, there is a need for an improved approach for training a neural network for deep learning, particularly with respect to exchanging and accumulating gradients among GPUs.

SUMMARY

According to an aspect of the present invention, a computer-implemented method is provided for accelerating neural network data parallel training in multiple graphics processing units (GPUs) using at least one central processing unit (CPU). The method includes forming a set of chunks. Each of the chunks includes a respective group of neural network layers other than a last layer. The method further includes performing one or more chunk-wise synchronization operations during a backward phase of the neural network data parallel training, by each of the multiple GPUs and the at least one CPU.

According to another aspect of the present invention, a computer program product is provided for accelerating neural network data parallel training in multiple graphics processing units (GPUs) using at least one central processing unit (CPU). The computer program product includes a non-transitory computer readable storage medium having program instructions embodied therewith. The program instructions are executable by a computer having the multiple GPUs to cause the computer to perform a method. The method includes forming a set of chunks. Each of the chunks includes a respective group of neural network layers other than a last layer. The method further includes performing one or more chunk-wise synchronization operations during a backward phase of the neural network data parallel training, by each of the multiple GPUs and the at least one CPU.

According to yet another aspect of the present invention, a computer processing system is provided. The computer processing system includes a set of multiple graphics processing units (GPUs). The computer processing system further includes a set of one or more central processing units (CPUs) for accelerating neural network data parallel training in the multiple GPUs. At least one of the processing units, from among the multiple GPUs and the one or more CPUs, is configured to form a set of chunks. Each of the chunks includes a respective group of neural network layers other than a last layer. The processing units, from among the multiple GPUs and the one or more CPUs, are configured to perform one or more chunk-wise synchronization operations during a backward phase of the neural network data parallel training.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to multi-Graphics Processing Unit (multi-GPU) deep learning using Central Processing Units (CPUs).

In an embodiment, an approach to data parallel training, referred to interchangeably herein as "CPU-GPU data parallel training" and "CGDP training", utilizes free CPUs on a host to speed up the training in the GPUs. It is to be noted that the terms "central processing unit", "CPU" and "host" are used interchangeably herein, and that the involved multiple GPUs and involved CPU(s) are located on a same host computer or "host" in short. In an embodiment, a cost model is proposed that can analyze the performance of both conventional and CPU-GPU data parallel trainings, and that can be used to optimize training performance. In an embodiment, the CPU-GPU data parallel training is optimized by introducing chunks of layers and providing a run-time algorithm that automatically finds the best configuration for the data parallel training. The present invention is effective for very deep neural networks that are a trend in deep learning. However, the present invention is not limited to solely the preceding and can be readily applied to other learning structures, as readily appreciated by one of ordinary skill in the art given the teachings of the present invention provided herein, while maintaining the spirit of the present invention.

In an embodiment, gradients are collected and accumulated on a host layer-by-layer during the backward phase of a training session. Once a partial gradient of a layer is available in a GPU, it is sent to the host. Gradient accumulation is done by CPUs while the GPU still computes partial gradients for the other layers. The accumulated gradient on the host is then sent back to the GPU for updating learnable parameters. This approach is particularly effective for convolutional neural networks that are widely used in image processing. Convolutional neural networks usually start with convolutional layers having a small number of parameters and end with fully connected layers having a large number of parameters. Since backward computations are performed from the ending layer to the starting layer, the collection and accumulation of the gradients of the ending layers will have been completed by the end of the backward phase even though they might take time. Furthermore, since collecting and accumulating the gradients of the starting layers take less time, they will be completed immediately after the backward phase with a very low overhead.

In an embodiment, a cost model can be provided for analyzing the performance of data parallel training on multiple GPUs. The cost model takes into account the costs for computation and communication, as well as the cost for synchronization among GPU streams that is important to GPU applications. By using the cost model, we show that the CGDP training is better than conventional training for deep neural networks, particularly but not limited to those having a small number of layers (less than 30).

In an embodiment, the CGDP training is extended by using chunks of layers to deal with very deep and "flat" neural networks in which the number of parameters in a layer is small and roughly equal to the ones in the other layers. For such networks, the cost model shows that the synchronization among GPU streams becomes a bottleneck and makes the training slow, and the purpose of using chunks is to reduce the effect of synchronization on training. A run-time algorithm is provided to automatically determine synchronization points during some first training iterations so that the running time is optimized.

These and other aspect and features of the present invention are described in further detail herein.

Figure 1:
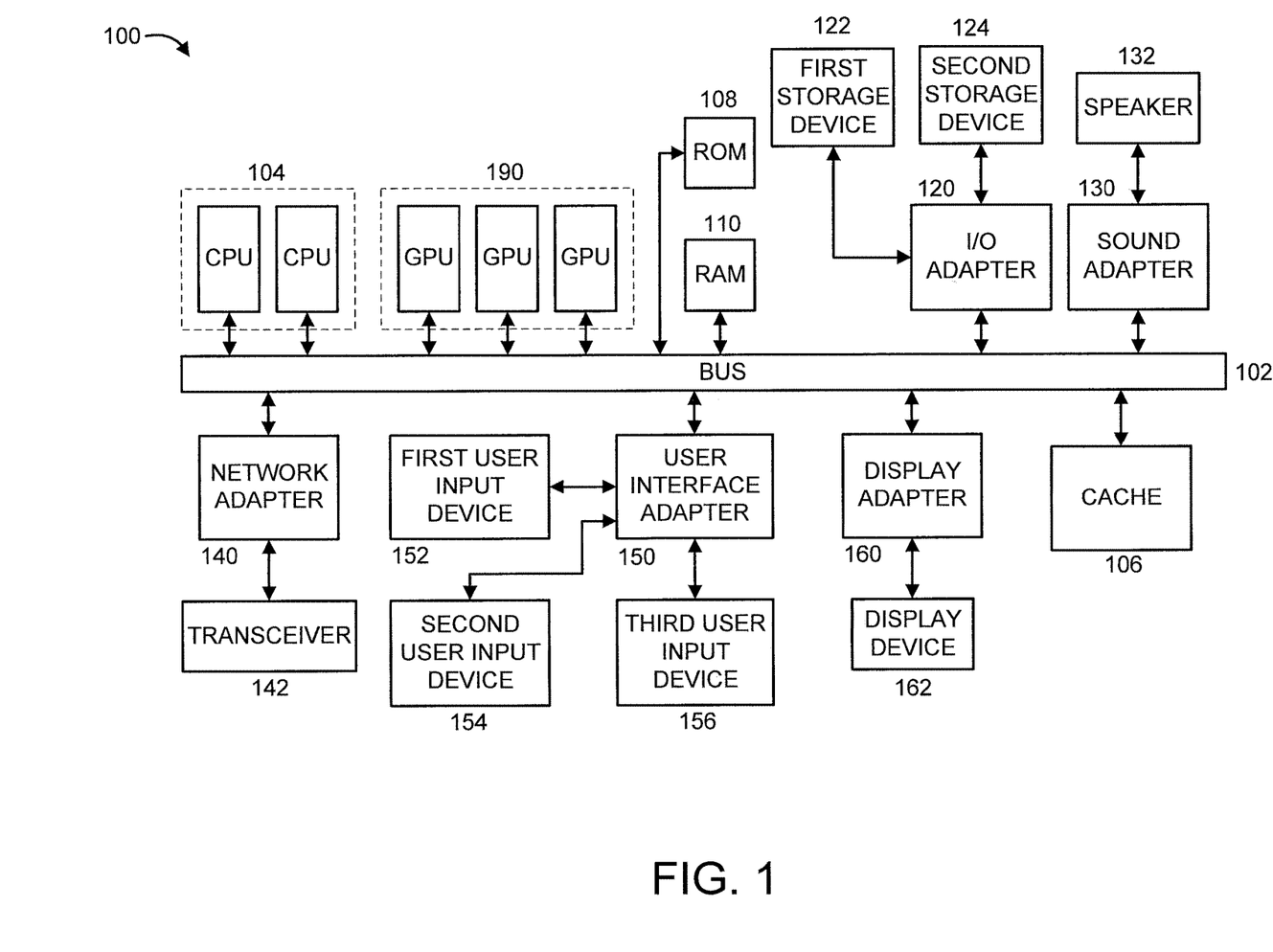
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes a set of central processing units (CPUs) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. A set of Graphics Processing Units (GPUs) 190 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, other and/or additional connections between the elements can used. These and other variations of the processing system 100 are readily contemplated by one of ordinary skill in the art given the teachings of the present invention provided herein.

Figure 2:
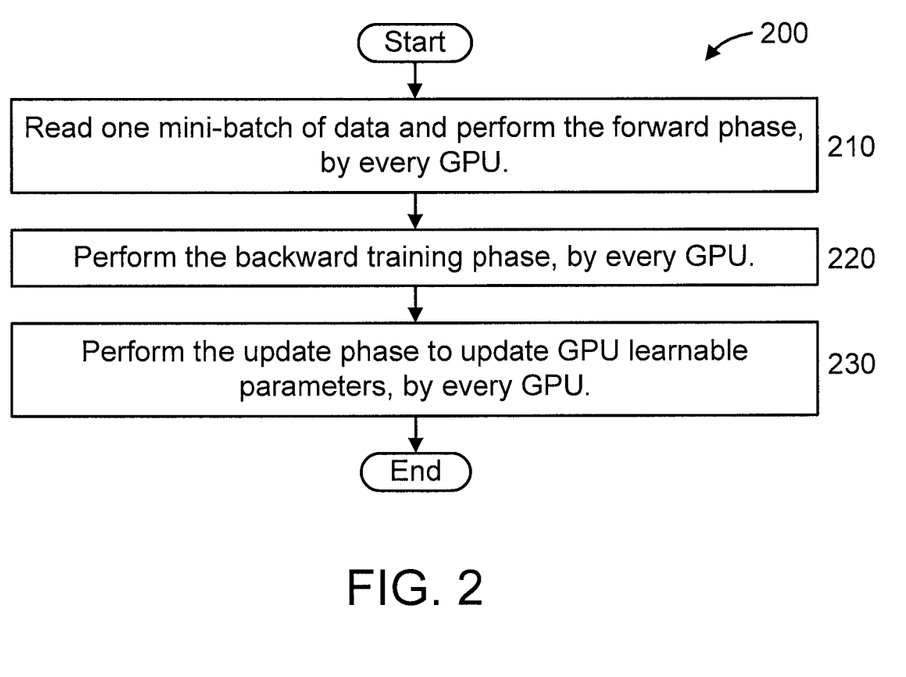
FIG. 2 shows an exemplary method for data parallel training, in accordance with an embodiment of the present invention.
Figure 3:
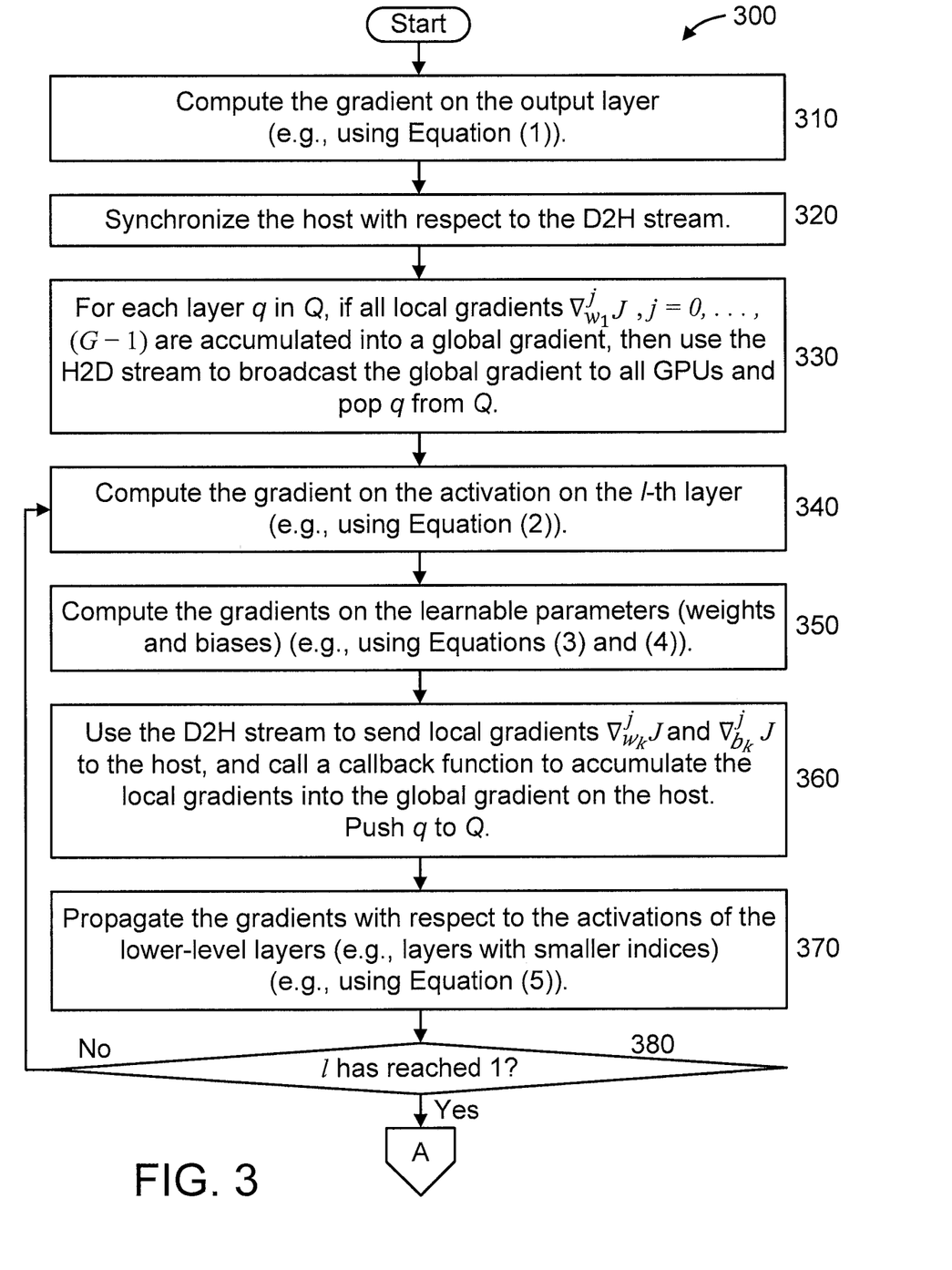
FIGS. 3-4 further show a block of the method of FIG. 2, in accordance with an embodiment of the present invention.
Figure 4:
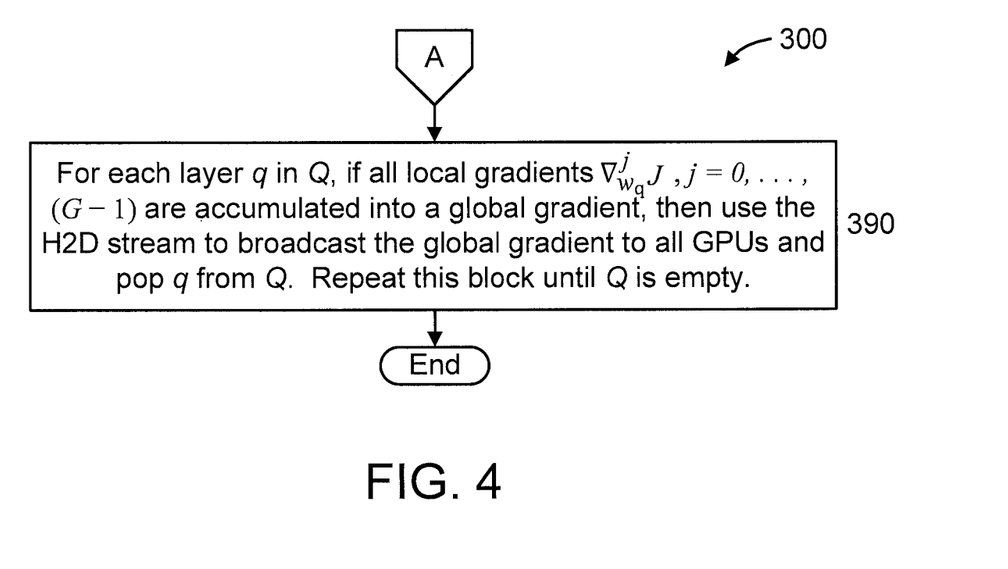
Figure 6:
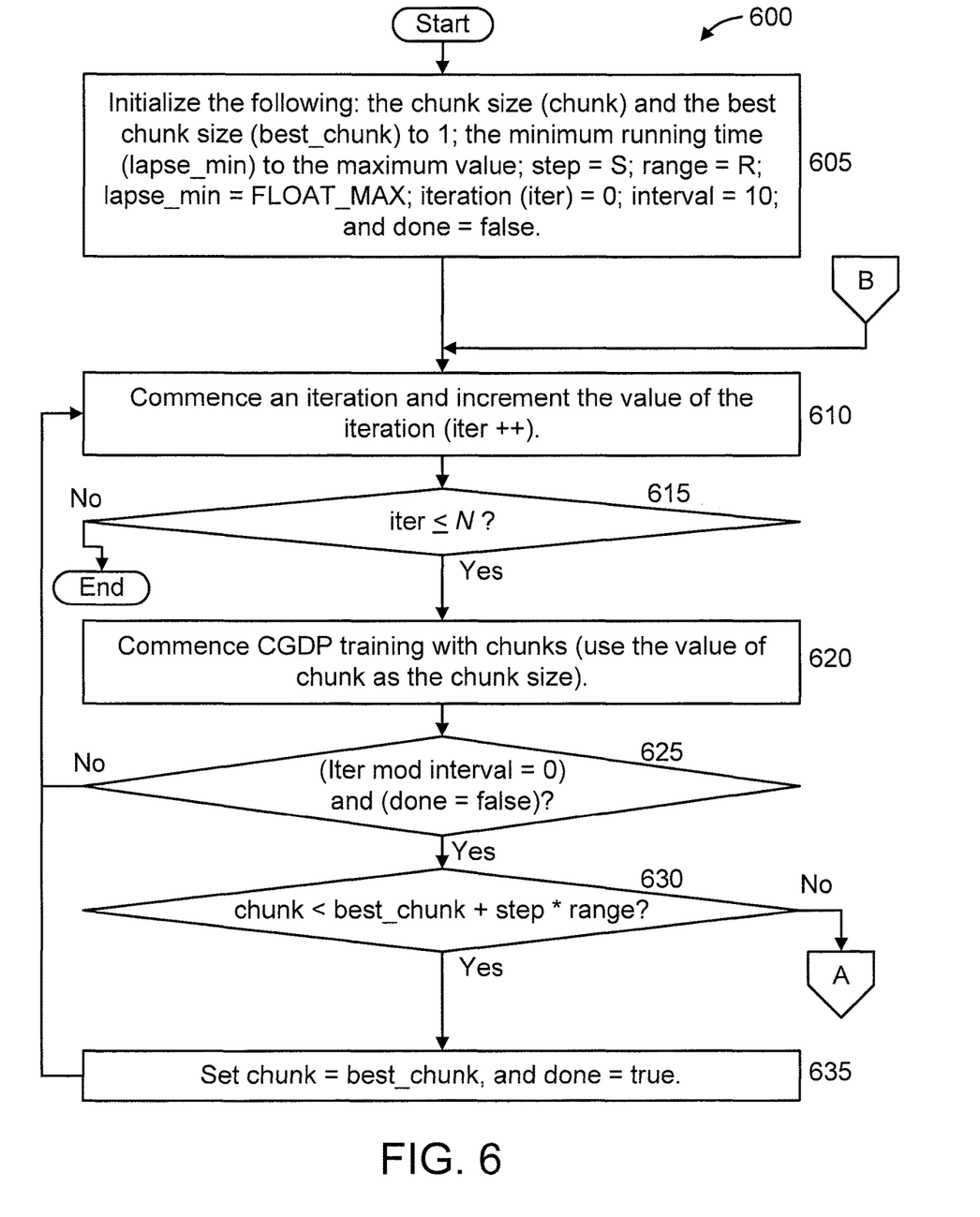
FIGS. 6-7 show an exemplary method for finding a good chunk size for CGDP training, in accordance with an embodiment of the present invention.
Figure 7:
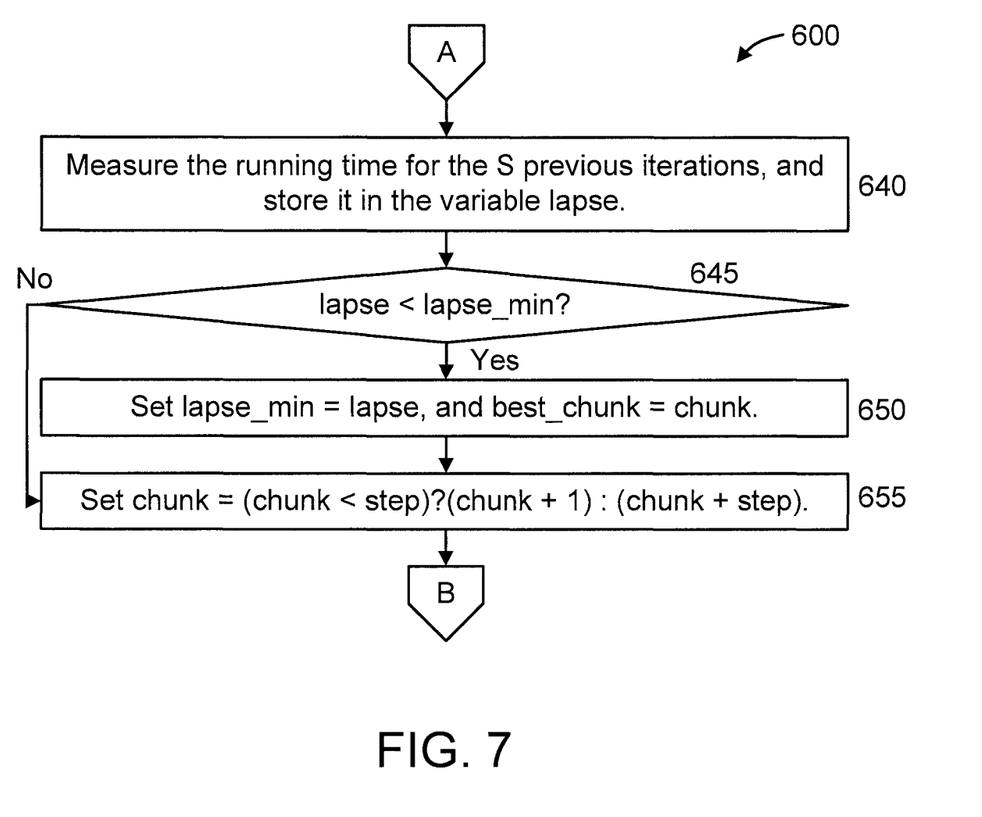

It is to be appreciated that processing system 100 may perform at least part of the method described herein including, for example, at least part of method 200 of FIG. 2 and/or at least part of method 300 of FIGS. 3-4 and/or at least part of method 600 of FIGS. 6-7.

FIG. 2 shows an exemplary method 200 for data parallel training, in accordance with an embodiment of the present invention. The data parallel training is interchangeably referred to herein as "CPU-GPU data parallel (CGDP) training", which utilizes free CPUs on a host to speed up the training in GPUs on the host. CGDP training involves a forward phase, a backward phase, and an update phase.

In an embodiment, blocks 210 through 230 represent one iteration in CGDP training in accordance with the present invention.

At block 210, read one mini-batch of data and perform the forward phase, by every GPU.

At block 220, perform the backward training phase, by every GPU.

At block 230, perform the update phase to update GPU learnable parameters, by every GPU.

It is to be appreciated that method 200 can be considered to be based on two observations. The first observation is that the gradients for one layer once computed will remain unchanged during the backward phase. Hence, there is no need to postpone gradient accumulation until the end of the backward phase. The second observation is that gradient accumulation can be performed with the support of the CPUs on the host. Based on these two observations, we overlap a parameter broadcast step and a gradient accumulation with the backward phase of one training iteration. To obtain the overlap of computation and communication in the present invention, GPU streams are used. In GPU-CUDA programming, operations in the same stream are executed in a sequential way, while operations in different streams runs in parallel. If there is no stream specified for an operation, then the default stream is used. We maintain three streams in our algorithm. The first stream (default stream) is used to compute the loss function in the forward phase and the gradients in the backward phases, and is also used to update parameters. The second stream (D2H stream) is used to send local gradients to the host and then call a callback function on the host to accumulate gradients. The third stream (H2D stream) is used to broadcast the global gradient back to the GPUs. It is to be noted that using more streams does not make data transfers occur in parallel because only one transfer in one direction is allowed at a time.

During the backward phase (block 220), gradients accumulations are performed on the host, and the accumulated gradients are broadcasted to all GPUs. Hence, at the end of the backward phase, all GPUs have the same accumulated gradients and they update their learnable parameters in parallel. This is different from conventional prior art data parallel training in which only a single server GPU (e.g., GPU 0) has the accumulated gradients and does the update phase. In other words, there is no server GPU in the CGDP training, in contrast to the conventional prior art data parallel training approach.

FIGS. 3-4 further show block 220 of the method 200 of FIG. 2, in accordance with an embodiment of the present invention;

Let Q be a queue to store layers whose backward computation has already been done. If a layer is in Q, then its gradient is sent to the host or accumulated in the global gradient on the host. The following blocks presume that the method is currently operating with respect to GPU j:

Referring to FIG. 3, at block 310, compute the gradient on the output layer. In an embodiment, the gradient on the output layer can be computed by Equation (1) as follows:

$$\nabla_{y^*} J = \nabla_{f} J_\theta(y^*, f) \quad (1)$$

At block 320, synchronize the host with respect to the D2H stream.

At block 330, for each layer q in Q, if all local gradients $\nabla_{w_q}^j J$, j=0, ..., (G−1) are accumulated into a global gradient, then use the H2D stream to broadcast the global gradient to all GPUs and pop q from Q.

At block 340, compute the gradient on the activation on the l-th layer. In an embodiment, the gradient on the activation on the l-th layer can be computed by Equation (2) as follows:

$$\nabla_{x_l} J = \left(\frac{\partial y_l}{\partial x_l}\right)^T \nabla_{y_l} J \quad (2)$$

At block 350, compute the gradients on the learnable parameters (weights and biases). In an embodiment, the gradients on the learnable parameters are computed by Equations (3) and (4) as follows:

$$\nabla_{w_l} J = \left(\frac{\partial x_l}{\partial w_l}\right)^T \nabla_{x_l} J \quad (3)$$

$$\nabla_{b_l} J = \left(\frac{\partial x_l}{\partial b_l}\right)^T \nabla_{x_l} J \quad (4)$$

At block 360, use the D2H stream to send local gradients $\nabla_{w_k}^j J$ and $\nabla_{b_k}^j J$ to the host, and call a callback function to accumulate the local gradients into the global gradient on the host. Push k to Q.

At block 370, propagate the gradients with respect to the activations of the lower-level layers (e.g., layers with smaller indices). In an embodiment, the gradients are propagated with respect to the activations of the lower-level layers using Equation (5) as follows:

$$\nabla_{y_{l-1}} J = \left(\frac{\partial x_l}{\partial y_{l-1}}\right)^T \nabla_{x_l} J \quad (5)$$

At block 380, determine if l reaches 1. If so, then proceed to block 390. Otherwise, continue blocks 340 to 370 until l reaches 1.

Referring to FIG. 4, at block 390, for each layer q in Q, if all local gradients $\nabla_{w_q}^j J$, j=0, ..., (G−1) are accumulated into the global gradient then use the H2D stream to broadcast the global gradient to all GPUs and pop q from Q. Repeat this block until Q is empty.

A global gradient of a layer is a gradient accumulated from all local gradients of that layer from all GPUs. It is worth noting that the synchronization block (block 320) at the beginning of a layer's backward phase is important, as it ensures that a local gradient of a layer is sent to host after the computation for the gradient totally finished.

Figure 5:
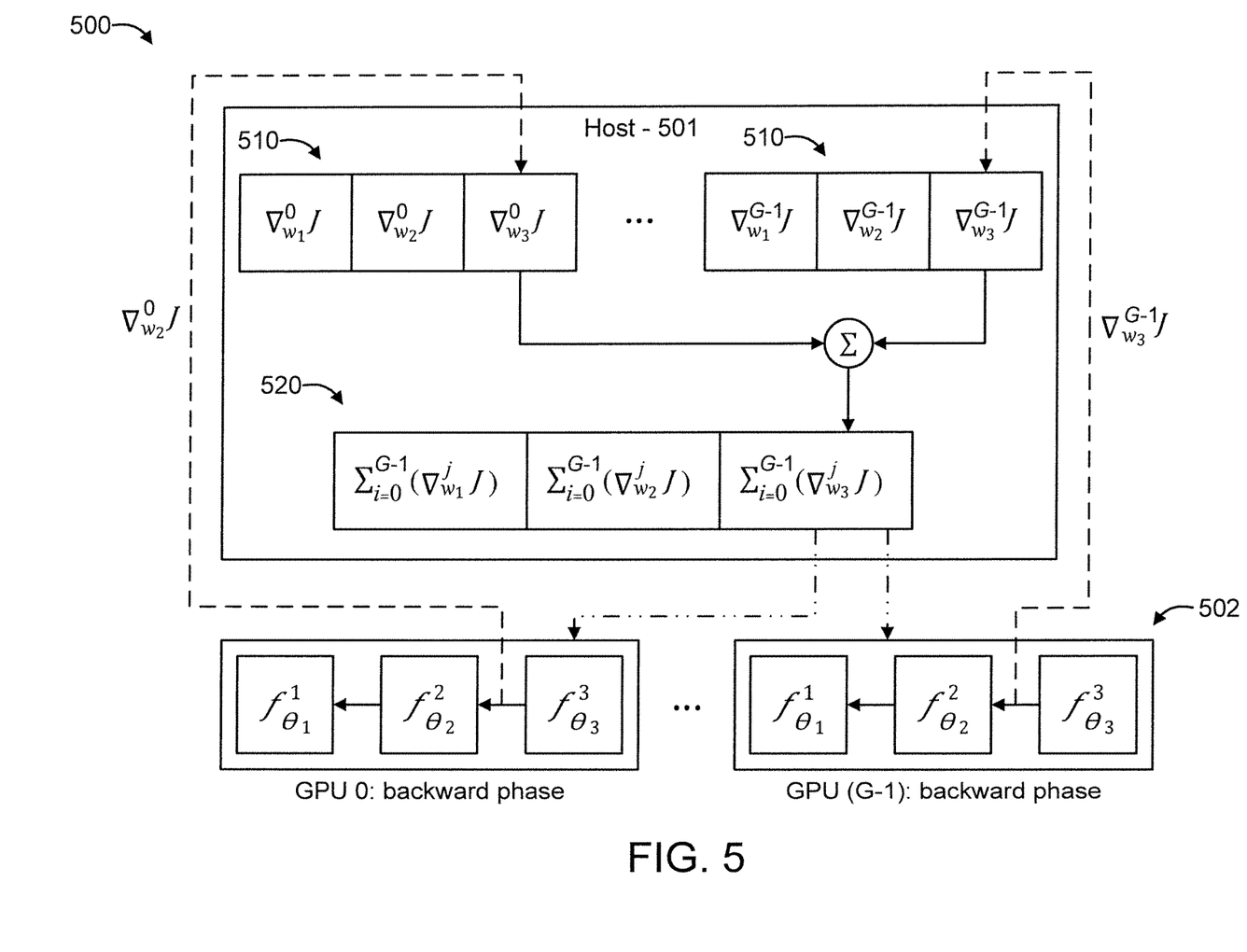
FIG. 5 shows an exemplary communication pattern between a host and GPUs during the backward phase of one iteration in CGDP training, in accordance with an embodiment of the present invention.

FIG. 5 shows an exemplary communication pattern 500 between a host 501 and a set of GPUs 502 during the backward phase of one iteration in CGDP training, in accordance with an embodiment of the present invention.

On the host, for each GPU, there is a concurrent vector of local gradients 510 produced by layers. Additionally, there is another concurrent vector of global gradients 520 accumulated from the local gradients 510. GPUs communicate directly with the CPUs to send gradients to the CPUs. Once a layer has computed gradients with respect to its learnable parameters, the gradients are sent to the host where they are accumulated into the global gradients (block 360 of method 300). Gradient accumulation on host is done in parallel using OpenMP. At the same time, the next layer computes other gradients. At the beginning of a layer in the backward phase, the present invention always checks the accomplishment of gradient accumulation for the layers in the queue Q and broadcasts their global gradients back to all GPUs (block 330 of method 300). Note that, once all layers have finished their computations, the accomplishment of gradient accumulation for the last layer (maybe some last layers) has not finished yet. Hence, another block at the end of the backward phase is used to check the accomplishment of the layer(s) and broadcast the remaining global gradient(s) to the GPUs (block 390 of method 300).

A description will now be given of a cost model, in accordance with an embodiment of the present invention.

We design a cost model for the CGDP training and analyze its performance. Without loss of generality, we assume that every GPU trains the same neural network in parallel at the same pace. In other words, the same layers finish its computation at the same time. Hence, it is enough to consider only the training on one GPU. Furthermore, we consider only the backward phase because we do not change the forward and update phases.

Given a layer $f^i$, let $t_{bp}^i$ be the back-propagation time on GPU of the layer (block 220 of method 200), $t_a^i$, be the time on host for gradient accumulation (block 360 of method 300), and $t_{bc}^i$, be the time for broadcasting gradients from host to device (block 390 of method 300). ta includes the synchronization time ($t_{as}$) and accumulation time ($t_{aa}$), where $t_{as}$ is the time taken for the synchronization between the default stream and the D2H stream, and $t_{aa}$ is the time on host for accumulating all gradients of the layer generated by all GPUs (including gradient copy from device to host). In the CGDP training, $t_{aa}$ and $t_{bc}$ are overlapped with the next $t_{bp}(s)$. In addition, $t_{aa}(s)$ of different layers are overlapped because they are handled by different processes in parallel.

Given an l-layer FFN, $f_\theta$, the running time of the backward phase using the CGDP training, T, is computed as follows:

$$T_{BP}^i = \sum_l^i (t_{bp}^l + t_{as}^l) + t_{aa}^i + t_{bc}^i \quad (6)$$

$$T = \max_{i=1,\ldots,l} (T_{BP}^i)$$

where $T_{BP}^i$ is called the total time of a layer i, measuring the time from the beginning of the backward phase to the point where the i-layer's accumulated gradient is available in the GPU. The definition of $T_{BP}^i$ is interesting in the sense that although it does not guarantee that, for i<j, the layer j will finish before the layer i during the backward phase, it is powerful to analyze performance. The runtime of the backward phase in conventional data parallel training, T', is computed as follows (in this case, there is no synchronization because we use only one stream, the default stream, or $t_{as}=0$):

$$T' = \sum_{i=l}^{1}(t_{bp}^i + t_{aa}^i + t_{bc}^i) = T_{BP}^1 + \sum_{i=l}^{2}(t_{aa}^i + t_{bc}^i)$$

It is worth noting that $t_{bc}$ in T is the time for broadcasting gradients from the host to every GPU, while tbc in T' is the time for broadcasting parameters from one GPU to the other GPUs. For one layer, the sizes of gradients and parameters are the same. Hence, we assume that these tbc (s) are the same though they might be different due to different connection topologies among CPUs and GPUs. In addition, $t_{aa}$ in T is performed by CPUs while the one in T' is performed by GPUs.

Let $T_{BP} = \Sigma_{i=l}^{1}(t_{bp}^i)$. Overhead time in the original data parallel training is defined by the following:

$$T_O' = T' - T_{BP} = \Sigma_{i=l}^{1}(t_{aa}^i + t_{bc}^i) \quad (7)$$

Overhead time in the CGDP training is non-trivial to formalize. However, by simplifying it using an assumption that $t_{aa}$ and $t_{bc}$ of layers l, l-1, . . . , 2 are perfectly overlapped with the next $t_{bp}$(s), it means $T = T_{BP}^1$, the overhead is defined by the following:

$$T_O = T - T_{BP} = \Sigma_{i=l}^{1}(t_{as}^i) + t_{aa}^1 + t_{bc}^1$$

The CGDP training is faster than the original data parallel training if $T_O < T_O'$. If the layer 1 has a small number of parameter, then $t_{aa}$ in $T_O$ is approximately equal to taa in T'O. Hence, $T_O < T'$ holds if $\Sigma_{i=l}^{1}(t_{as}^i) < \Sigma_{i=l}^{2}(t_{aa}^i + t_{bc}^i)$.

A description will now be given regarding chunk size optimization, in accordance with an embodiment of the present invention.

In an embodiment, the present invention provides a fine-grained optimization for CGDP training. In the naive CGDP training, gradients are sent to host layer-by-layer, which is triggered by a synchronization between the default stream and the D2H stream. In other words, the D2H stream waits for the computation of a layer in the default stream to be finished. For neural networks that have many layers, e.g. Resnet-152 with 152 layers, there are many synchronizations in the CGDP training, which slows down the backward phase. We first extend the naive CGDP training by using chunks to reduce the effect of synchronizations on the performance of the backward phase, and then provide a run-time algorithm to automatically find a good setting for the CGDP training with chunks.

A description will now be given regarding CGDP training with chunks, in accordance with an embodiment of the present invention.

As stream synchronization slows down the performance of the backward phase, it is better to do synchronization after some layers instead of one layer. In particular, we would like to optimize the part $(\Sigma_{i=l}^{1}(t_{as}^i) + t_{aa}^i + t_{bc}^i))$ of T in Equation 6.

We call a group of layers whose gradients are sent to host together a chunk of layers, and denote it by { }. Given a neural network, we can use multiple chunks of layers with different sizes for the CGDP training. For example, if a neural network has 6 layers: $f_{\theta_1}^1, f_{\theta_2}^2, f_{\theta_3}^3, f_{\theta_4}^4, f_{\theta_5}^5, f_{\theta_6}^6$, we could use 3 chunks $\{f_{\theta_1}^1\}$, $\{f_{\theta_2}^2, f_{\theta_3}^3\}$, and $\{f_{\theta_4}^4, f_{\theta_5}^5, f_{\theta_6}^6\}$. The backward phase of the CGDP training with chunks is performed as follows: compute gradients for the layers of the chunk $\{f_{\theta_4}^4, f_{\theta_5}^5, f_{\theta_6}^6\}$ using the default stream, synchronize with the D2H stream to send the gradients of these layers to host, continue to compute gradients for the layers of the chunk $\{f_{\theta_2}^2, f_{\theta_3}^3\}$ using the default stream, synchronize with the D2H stream to send the gradients of these layers to host, continue to compute gradients for the layers of the chunk $\{f_{\theta_1}^1\}$, synchronize with the D2H stream to send the gradients of these layers to host, and wait for all gradients are available in GPUs. It is clear that we need only three synchronizations using chunks instead of six synchronizations without chunks.

There exists a tradeoff between the number of synchronizations and the number of layers in a chunk in the CGDP training with chunks. It is obvious that the CGDP training with chunks reduces the number of synchronizations because $\Sigma_{i=l}^{1}(t_{as}^i)$ becomes $\Sigma_{j=l}^{c}(t_{as}^i)$, where c is the number of chunks. Nevertheless, using chunks potentially produces more overhead since we have postponed gradients accumulations of layers in a chunk until the last layer in the chunk finishes its back-propagation. In other words, $(t_{aa}^i + t_{bc}^i)$ for a layer i becomes the sum of $(t_{aa}^i + t_{bc}^i)$ of all layers j in the chunk to which the layer i belongs. This makes the CGDP training difficult to be optimized.

Proposition 4.1. Given an l-layer FFN, there are $$\sum_{k=1}^{l-1} \binom{l-1}{k}$$

ways to group layers by chunks for the CGDP training with chunks.

Proof. The proof is completed by counting the total number of ways to insert k delimiters, k=1, 2, . . . , (l−1), into the spaces between two consecutive characters in the sequence "$f_1 f_2 \ldots f_l$", so that there is no more than one delimiter in a space.

A description will now be given regarding a heuristic algorithm for finding chunks, in accordance with an embodiment of the present invention.

In an embodiment, the present invention provides a run-time algorithm to find a good chunk size so that the time for the backward phase is minimized. In general, the algorithm runs for some first training iterations and tries to determine the best chunk size at which the running time for training is smallest. Two heuristic rules are provided to decide how to expand the search space and how to stop the algorithm.

To narrow the search space, only the case where chunks have the same size except some last layers of the backward phase are considered. Assume that we train an l-layer FFN using the CGDP training with chunks of the same size k. If (l mod k=0), there are $$\left(\frac{l}{k} - 1\right)$$

chunks with the size k, including layers from 1 to (k+1), and there are k chunks with the size 1, including the remaining layers from k to 1. If (l mod k≠0) there are $$\left\lfloor \frac{l}{k} \right\rfloor$$

chunks with the size k, including layers from 1 to $$\left(l - k * \left\lfloor \frac{l}{k} \right\rfloor + 1\right),$$

and there are $$\left(l - k * \left\lfloor \frac{l}{k} \right\rfloor\right)$$

chunks with the size 1, including the remaining layers from $$\left(l - k * \left\lfloor \frac{l}{k} \right\rfloor\right)$$

to 1. Some last layers have a chunk size of 1 because we would like to reduce the effect of $t_{aa}^i$ and $t_{bc}^i$ on the overhead of training.

The overhead of synchronizations is high, which results in that the total overhead being high. When we slowly increase the chunk size, we start to get better results (chunk sizes 2, 4, 6, 8). However, using a big chunk size is not good due to the overhead of gradient accumulation.

FIGS. 6-7 show an exemplary method 600 for finding a good chunk size for CGDP training, in accordance with an embodiment of the present invention. The method can be performed, for example, by any of the CPUs and/or the GPUs. Presume that we train a neural network with N iterations. There are two user-defined parameters in the algorithm: step; and range. The parameter step is used as a heuristic parameter to define how to expand the search space of chunk size and how to stop the algorithm. The parameter range is used to determine how to stop the algorithm and it is used together with the parameter step. A variable chunk is used to store the chunk size for the current iteration, and is the variable we want to optimize. It is updated during the algorithm and is set to the value of variable best_chunk once the algorithm is stopped. The variable best_chunk holds the chunk size that results in the minimum running time that is stored in a variable lapse_min. A variable lapse is the running time of the last interval iterations.

At block 605, initialize the following: the chunk size (chunk) and the best chunk size (best_chunk) to 1; the minimum running time (lapse_min) to the maximum value (mathematically, +∞); step=S; range=R; lapse_min=FLOAT_MAX; iteration (iter)=0; interval=10; and done=false.

At block 610, commence an iteration and increment the value of the iteration (iter++).

At block 615, determine whether or not the (current) value of the iteration (iter) is less than or equal to N (iter>N). If so, then proceed to block 620. Otherwise, terminate the method.

After each interval iteration, the algorithm is triggered. Users can change the value of the interval. However, we use a fixed value of 10 for the value of the interval here for the sake of illustration.

At block 620, commence CGDP training with chunks (use the value of chunk as the chunk size).

At block 625, determine whether or not (iter mod interval=0) and (done=false). If so, then proceed to block 630. Otherwise, return to block 610.

At block 630, determine whether or not chunk<best_chunk+step*range. If so, then proceed to block 635. Otherwise, proceed to block 640.

At block 635, set chunk=best_chunk, and done=true.

At block 640, measure the running time for the S previous iterations, and store it in the variable lapse (where S denotes step).

At step 645, determine whether or not lapse<lapse_min. If so, then proceed to step 650. Otherwise, proceed to step 655.

At step 650, set lapse_min=lapse, and best_chunk=chunk.

At step 655, set chunk=(chunk<step)?(chunk+1):(chunk+step).

A further description of method 600 will now be given.

Method 600 operates as follows. It first initializes the chunk size (chunk) and the best chunk size (best_chunk) to 1, and the minimum running time (lapse_min) to the maximum value (mathematically, +∞) (per block 605). After each interval iterations, the algorithm is triggered (per block 620). Users can change the value of interval. However, we use a fixed value of 10 for it, for the sake of illustration. Of course, other values can be used. Then, the algorithm measures the running time for the last interval iterations, and stores it in the variable lapse (per block 640). If lapse<lapse_min, then it updates the values of best_chunk and lapse_min to the current values. Next, it updates the values of best_chunk and lapse_min to the current values (per block 650). Next, it expands the search space of the chunk size with a heuristic rule, chunk:=(chunk<step)?(chunk+1):(chunk+step) (per block 655). The rule says that, at the beginning of the algorithm, where chunk<step, we slowly increase the value of the chunk size by 1. Otherwise, we increase the chunk size by step. This rule is flexible to adjust the search space of the algorithm. If step is large and close to the number of layers, we aggressively scan most of the values for the chunk size. If it is small, we make big jumps for the chunk size and ignore some values to finish early. Another rule is to determine when to stop the algorithm, that is chunk<best_chunk+step*range (per block 630). Intuitively, it says that once we found a best_chunk, we run the algorithm another range times. If there is no a better chunk size, then the algorithm is stopped. It is to be noted that if best_chunk <step, then the algorithm may run another (step-best_chunk+range) times before deciding to stop.

Figure 8:
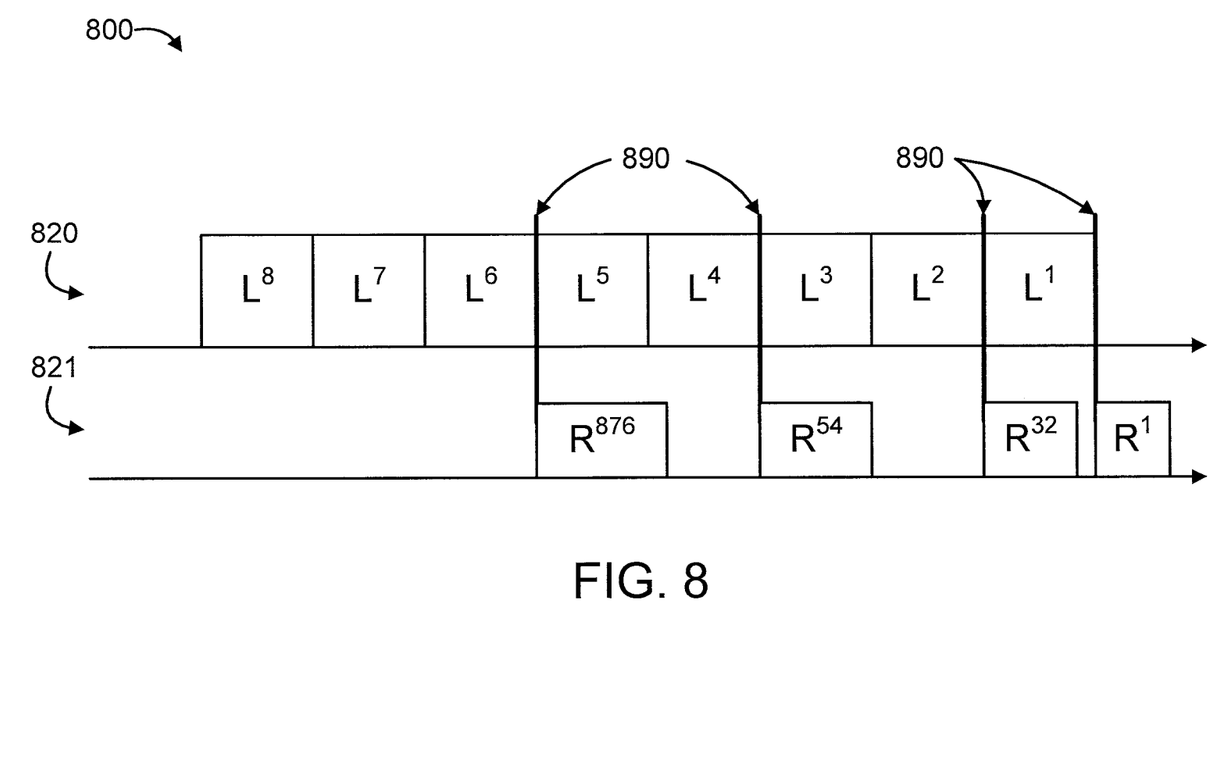
FIG. 8 shows an exemplary chunk-based synchronization scheme for a plurality of layers during a backward phase of neural network data parallel training, in accordance with an embodiment of the present invention.

FIG. 8 shows an exemplary chunk-based synchronization scheme 800 for a plurality of layers during a backward phase of neural network data parallel training, in accordance with an embodiment of the present invention.

In FIG. 8, layers are denoted by $L^i$, where i denotes the layer number(s). Eight layers ($L^1$ through $L^8$) are shown being processed for the backward phase.

According to the chunk-based synchronization scheme 800, gradient reduction is performed for groups of layers (i.e., chunks). Remaining layers (last ones) are performed one-by-one to minimize overhead. The chunk-based synchronization scheme involves multiple synchronization points 890. Hence, synchronization is performed with respect to all of layers $L^8$, $L^7$, and $L^6$ thereby resulting in a gradient reduction $R^{876}$, then another synchronization is performed with respect to all of layers $L^5$ and $L^4$ thereby resulting in a gradient reduction $R^{54}$, then yet another synchronization is performed with respect to all of layers $L^3$ and $L^2$ thereby resulting in a gradient reduction $R^{32}$, and finally another synchronization is performed with respect to layer $L^1$ thereby resulting in a gradient reduction $R^1$. Stream 0 820 for GPU 0 is used for gradient computation in the backward phase, while stream 1 821 for GPU 0 is used to send the local gradients to the host (and then call a callback function on the host to accumulate the gradients. With less synchronizations than conventional layer-by-layer synchronization schemes, the backward computations of a layer will be faster making the whole backward computation faster, thus providing a significant benefit over the conventional layer-by-layer synchronization schemes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for accelerating neural network data parallel training in multiple graphics processing units (GPUs) using at least one central processing unit (CPU), the method comprising:
    forming a set of chunks, each of the chunks including a respective group of neural network layers other than a last layer; and
    performing one or more chunk-wise synchronization operations during a backward phase of the neural network data parallel training, by and between each of the multiple GPUs and the at least one CPU,
    wherein said forming step comprising determining a chunk size for forming the set of chunks, based on a condition for terminating the determining step.

2. The computer-implemented method of claim 1, wherein the neural network data parallel training is performed over a plurality of iterations, and the method further comprises evaluating a performance of the neural network data parallel training at each of the plurality of iterations.

3. The computer-implemented method of claim 2, further comprising determining a chunk size for forming the set of chunks, based on a frequency with which the performance of the neural network data parallel training is evaluated.

4. The computer-implemented method of claim 1, wherein the condition for terminating the determining step comprises a current chunk of a given size having a shorter run-time than a previous chunk of a different size, and wherein the the method determines the chunk size as the given size.

5. The computer-implemented method of claim 1, further comprising determining a chunk size for forming the set of chunks, based on a metric for expanding a chunk search space.

6. The computer-implemented method of claim 1, further comprising sending, from each of the multiple GPUs to the at least one CPU for accumulation, partial gradients for one or more of the chunks, while each of the multiple GPUs continue to compute partial gradients for one or more other ones of the chunks.

7. The computer-implemented method of claim 6, further comprising broadcasting, from the at least one CPU to the multiple GPUs, a global gradient determined by the at least one CPU.

8. The computer-implemented method of claim 7, wherein a first dedicated stream is used for said sending step and to call a callback function to cause continued computation of the partial gradients for the one or more other ones of the chunks, and a second dedicated stream is used for said broadcasting step.

9. The computer-implemented method of claim 1, further comprising:
    generating a cost model for the neural network data parallel training that considers a computation cost, a communication cost and a synchronization cost for the neural network data parallel training; and
    evaluating the neural network data parallel training based on the cost model.

10. The computer-implemented method of claim 9, further comprising adjusting parameters for the backward phase of the neural network data parallel training, based on the cost model.

11. The computer-implemented method of claim 9, further comprising automatically determining synchronization points for performing the one or more chunk-wise synchronization operations, based on the cost model.

12. A computer program product for accelerating neural network data parallel training in multiple graphics processing units (GPUs) using at least one central processing unit (CPU), the computer program product comprising a non-transitory computer readable storage medium having program instructions embodied therewith, the program instructions executable by a computer having the multiple GPUs to cause the computer to perform a method comprising:
    forming a set of chunks, each of the chunks including a respective group of neural network layers other than a last layer; and
    performing one or more chunk-wise synchronization operations during a backward phase of the neural network data parallel training, by and between each of the multiple GPUs and the at least one CPU, wherein said forming step comprises determining a chunk size for forming the set of chunks, based on a condition for terminating the determining step.

13. The computer program product of claim 12, wherein the neural network data parallel training is performed over a plurality of iterations, and the method further comprises evaluating a performance of the neural network data parallel training at each of the plurality of iterations.

14. The computer program product of claim 13, wherein the method further comprises determining a chunk size for forming the set of chunks, based on a frequency with which the performance of the neural network data parallel training is evaluated.

15. The computer program product of claim 12, wherein the condition for terminating the determining step comprises a current chunk of a given size having a shorter run-time than a previous chunk of a different size, and wherein the method determines the chunk size as the give size.

16. The computer program product of claim 12, wherein the method further comprises determining a chunk size for forming the set of chunks, based on a metric for expanding a chunk search space.

17. The computer program product of claim 12, wherein the method further comprises sending, from each of the multiple GPUs to the at least one CPU for accumulation, partial gradients for one or more of the chunks, while each of the multiple GPUs continue to compute partial gradients for one or more other ones of the chunks.

18. A computer processing system, comprising:
a set of multiple graphics processing units (GPUs); and
a set of one or more central processing units (CPUs) for accelerating neural network data parallel training in the multiple GPUs,
wherein at least one of the processing units, from among the multiple GPUs and the one or more CPUs, is configured to form a set of chunks, each of the chunks including a respective group of neural network layers other than a last layer, and
wherein the processing units, from among and between the multiple GPUs and the one or more CPUs, are configured to perform one or more chunk-wise synchronization operations during a backward phase of the neural network data parallel training,
wherein said forming step comprises determining a chunk size for forming the set of chunks, based on a condition for terminating the determining step.

* * * * *